United States Patent [19]
Furlani et al.

[11] Patent Number: 6,088,148
[45] Date of Patent: *Jul. 11, 2000

[54] MICROMAGNETIC LIGHT MODULATOR

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[*] Notice: This patent is subject to a terminal disclaimer.

[21] Appl. No.: 09/183,148

[22] Filed: Oct. 30, 1998

[51] Int. Cl.⁷ .................. G02B 5/18; G02F 1/09
[52] U.S. Cl. ............ 359/280; 359/298; 359/572; 359/573; 359/578; 359/579; 359/245
[58] Field of Search ...................... 359/245, 237, 359/280–284, 238, 240, 572, 573, 578, 579, 298

[56] References Cited

U.S. PATENT DOCUMENTS

| | | | |
|---|---|---|---|
| 5,311,360 | 5/1994 | Bloom et al. | 359/572 |
| 5,677,783 | 10/1997 | Bloom et al. | 359/224 |
| 5,757,536 | 5/1998 | Ricco et al. | 359/224 |
| 5,793,519 | 8/1998 | Furlani et al. | 359/291 |
| 5,895,515 | 4/1999 | Furlani et al. | 359/290 |
| 5,910,856 | 6/1999 | Ghosh et al. | 359/291 |
| 5,912,608 | 6/1999 | Asada | 359/223 |
| 5,914,801 | 6/1999 | Dhuler et al. | 359/230 |
| 6,014,257 | 1/2000 | Furlani et al. | 359/573 |

OTHER PUBLICATIONS

R. H. Victora, et al. "Structure and Micromagnetic Predictions for Hysteretic Phenomena in a Novel Co–Pt Permanent Magnetic Thin Film," Journal of Magnetism and Magnetic Materials, vol. 97, 1991, pp. 343–352.

Primary Examiner—Georgia Epps
Assistant Examiner—Evelyn A. Lester
Attorney, Agent, or Firm—Clyde E. Bailey, Sr.

[57] ABSTRACT

A modulator for modulating an incident beam of light uses a substantially planar light reflection surface formed by a light reflection layer associated with a plurality of deformable elements and a light reflection layer associated with a plurality of fixed elements. The fixed and deformable elements are arranged in a cavity of a substrate supporting the modulator. Light is modulated when a current is applied to a conductive element operably associated with the deformable elements causing the light reflective layer associated with the deformable element to deflect towards the base of the cavity from its substantial planar relations with the light reflecting layer of the fixed element.

7 Claims, 4 Drawing Sheets

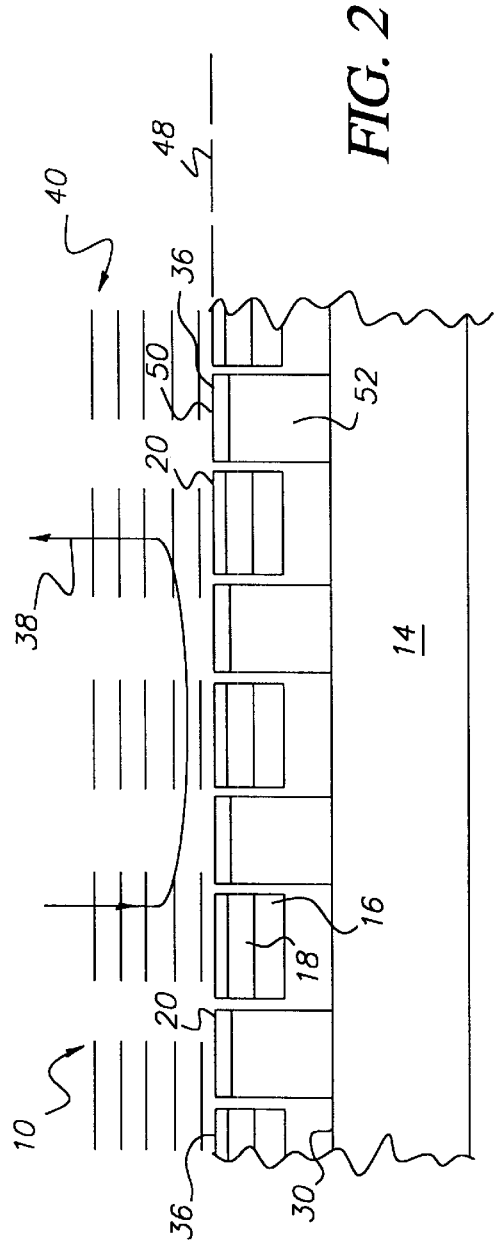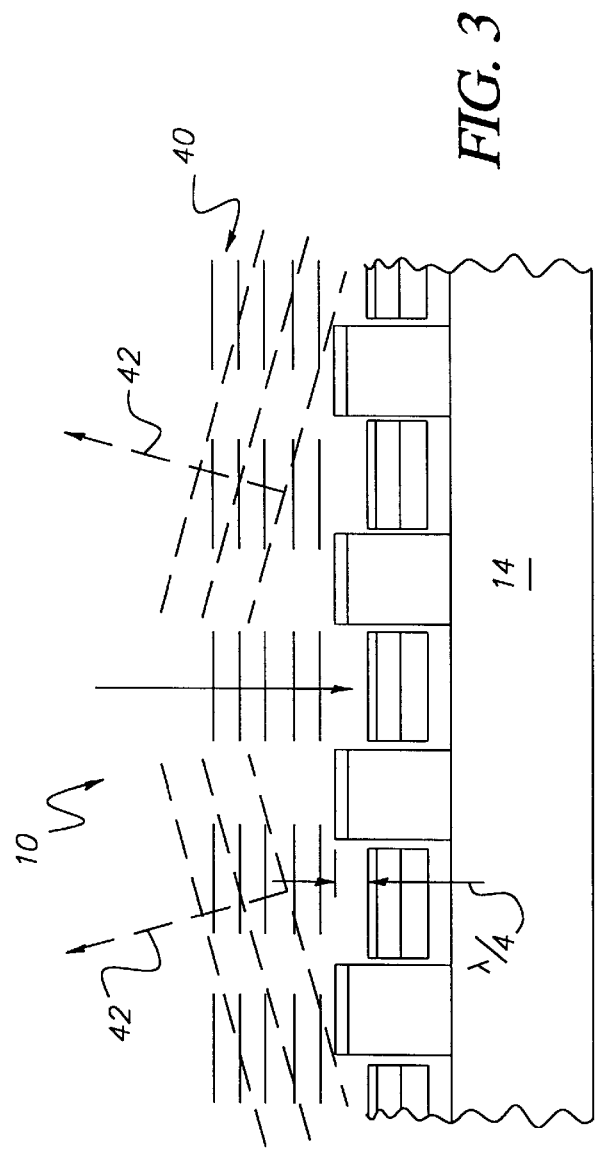

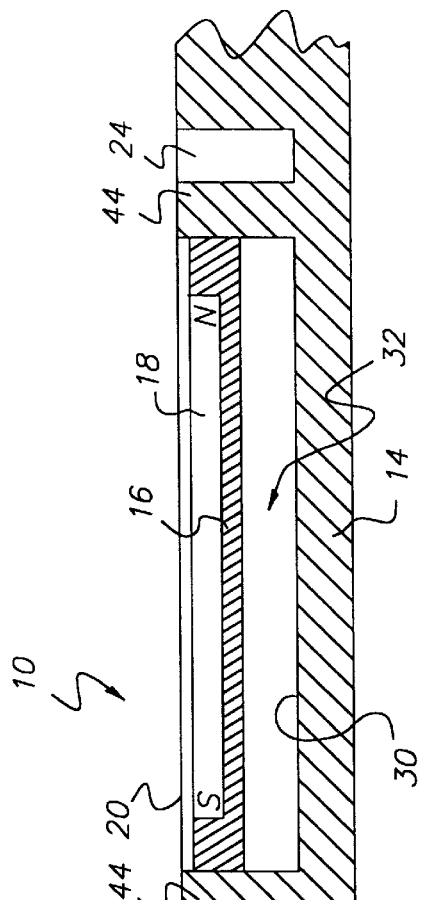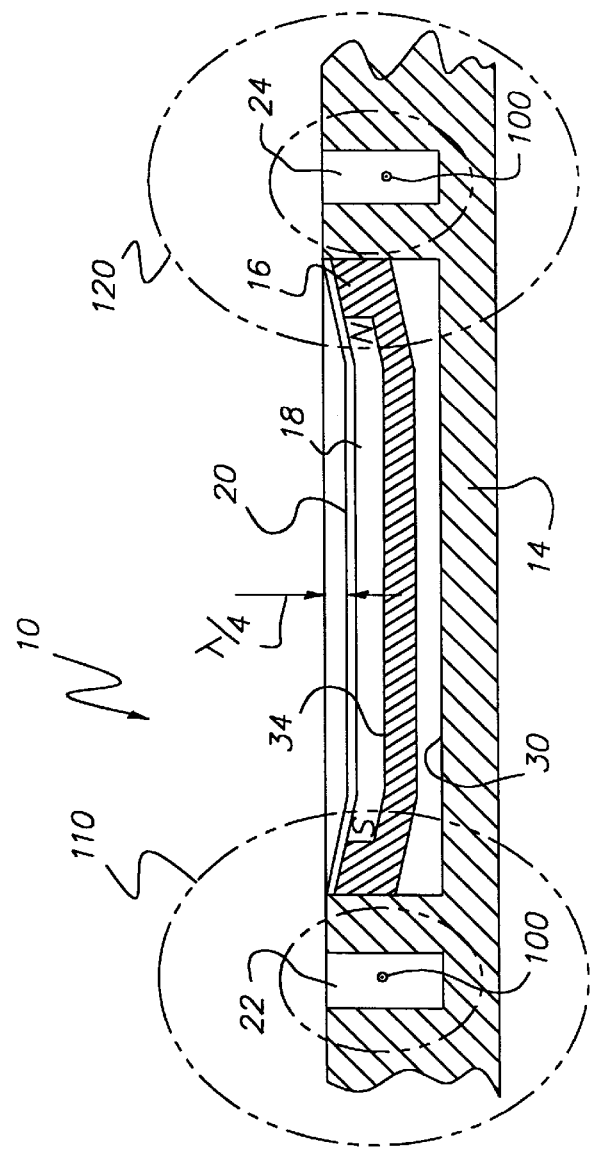

MICROMAGNETIC LIGHT MODULATOR

FIELD OF THE INVENTION

This invention relates to a modulator for modulating a beam of light. More particularly, the invention concerns a micromagnetic modulator having a substantially planar light reflection surface formed from deformable and fixed light reflecting layers that eliminates the stiction problem associated with existing modulators.

BACKGROUND OF THE INVENTION

Advances in micromachining technology have given rise to a variety of Micro-electromechanical systems (MEMS) including light modulators for low cost display applications. Such modulators provide high-resolution, high operating speeds (KHz frame rates), multiple gray scale levels, color adaptability, high contrast ratio, and compatibility with VLSI technology. One such modulator has been disclosed in U.S. Pat. No. 5,311,360, titled "Method and Apparatus For Modulating A Light Beam" issued May 10, 1994, to Bloom et al. This modulator is a micromachined reflective phase grating. It consists of a plurality of equally spaced deformable elements in the form of beams suspended at both ends above a substrate thereby forming a grating. The deformable elements have a metallic layer that serves both as an electrode and as reflective surface for incident light. The substrate is also reflective and contains a separate electrode. The deformable elements are designed to have a thickness equal to $\lambda/4$ where $\lambda$ is the wavelength of the incident light source. They are supported a distance of $\lambda/4$ above, and parallel to, the substrate. Thus, when the deformable elements are unactivated, i.e., undeflected, the distance between their top surface and the substrate equals $\lambda/2$. Thus, when light impinges perpendicularly to the surface of this surface the grating reflects light as a flat mirror. However, when a sufficient voltage (switching voltage) is applied between the deformable elements and the substrate, the resulting electrostatic force pulls a portion of the deformable elements down a distance $\lambda/4$ toward the substrate, thereby reducing the distance between the top portion of the elements and the substrate to $\lambda/4$. Thus, light reflected from this portion of the deformable elements is out of phase with that from the substrate and a diffraction pattern is formed. Optical systems can intercept the diffracted light with output occurring only when the deformable elements are activated (i.e., pulled down). For display applications, a number of deformable elements are grouped for simultaneous activation thereby defining a pixel and arrays of such pixels are used to form an image.

U.S. Pat. No. 5,677,783 titled "Method Of Making A Deformable Grating Apparatus For Modulating A Light Beam And Including Means For Obviating Stiction Between Grating Elements And Underlying Substrate" issued Oct. 14, 1997 to Bloom et al. discloses a modulator which obviates stiction between grating elements and underlying substrate. Stiction is the tendency for two or more surfaces to adhere when brought into contact. One problem with the prior art modulator is that it is activated via an electrostatic force that is nonlinear. Specifically, as the voltage applied to the modulator increases from zero, the activated deformable elements deflect incrementally until they reach approximately ⅓ of their full scale deflection, and then they jump the remaining distance until they impact the substrate. Therefore, when the prior art modulator modulates light, the activated deformable elements contact the substrate and this gives rise to significant stiction problems.

Therefore, a need persists in the art for a modulator in which the deformable elements can be held stationary at any point over the entire range of their motion so that light modulation can occur without the deformable elements contacting the substrate thereby eliminating the stiction problem.

SUMMARY OF THE INVENTION

The present invention is directed to overcoming one or more of the problems set forth above. Briefly summarized, according to one aspect of the present invention, a modulator for modulating an incident beam of light, comprises:

- a substrate comprising a cavity having a base and side walls surrounding said base;
- a first plurality of equally spaced apart, deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;
- a second plurality of equally spaced apart, fixed elements wherein each one of said second plurality of fixed elements comprises a support member and a second light reflection layer deposited on said support member for reflecting said incident beam of light, and wherein said support member is fixedly attached to said base of said cavity, and wherein a single one of said plurality of fixed elements is arranged between adjacent spaced apart deformable elements such that said first and second light reflection layers form a substantially planar light reflection surface when said deformable elements are in a first position;
- at least one conductive element arranged substantially lengthwise in at least one of said side walls surrounding said cavity in an electro-magnetic relationship to said magnetic layer of said first plurality of equally spaced apart deformable elements; and
- means for applying a current through said conductive element, said current producing a magnetic field in said first plurality of deformable elements that causes said first plurality of deformable elements to deflect to a second position towards said cavity and away from said substantially planar light reflection surface, whereby light reflecting from said plurality of first light reflection layers destructively interferes with light reflected from said plurality of second light reflection layers thereby causing modulation of said incident light.

It is, therefore, an advantageous effect of the method of the invention that light modulation can occur without the deformable elements contacting the substrate thereby eliminating the stiction problem encountered in prior art modulators.

BRIEF DESCRIPTION OF THE DRAWINGS

These and other aspects, objects, features, and advantages of the present invention will be more clearly understood and appreciated from a review of the following detailed description of the preferred embodiments and appended claims, and by reference to the accompanying drawings, wherein:

FIG. 2 is a sectional view of the modulator of FIG. 1 taken along line II—II of FIG. 1 wherein the deformable elements are in the up position;

FIG. 3 is a sectional view of the modulator of FIG. 1 taken along line II—II of FIG. 1 wherein the deformable elements are in the down position;

FIG. 5 is a sectional view of the modulator of FIG. 1 taken along line V—V of FIG. 1 wherein the deformable elements are in the up position; and FIG. 6 is a sectional view of the modulator of FIG. 1 taken along line V—V of FIG. 1 wherein the deformable elements are in the down position;

DETAILED DESCRIPTION OF THE INVENTION

Figure 1:
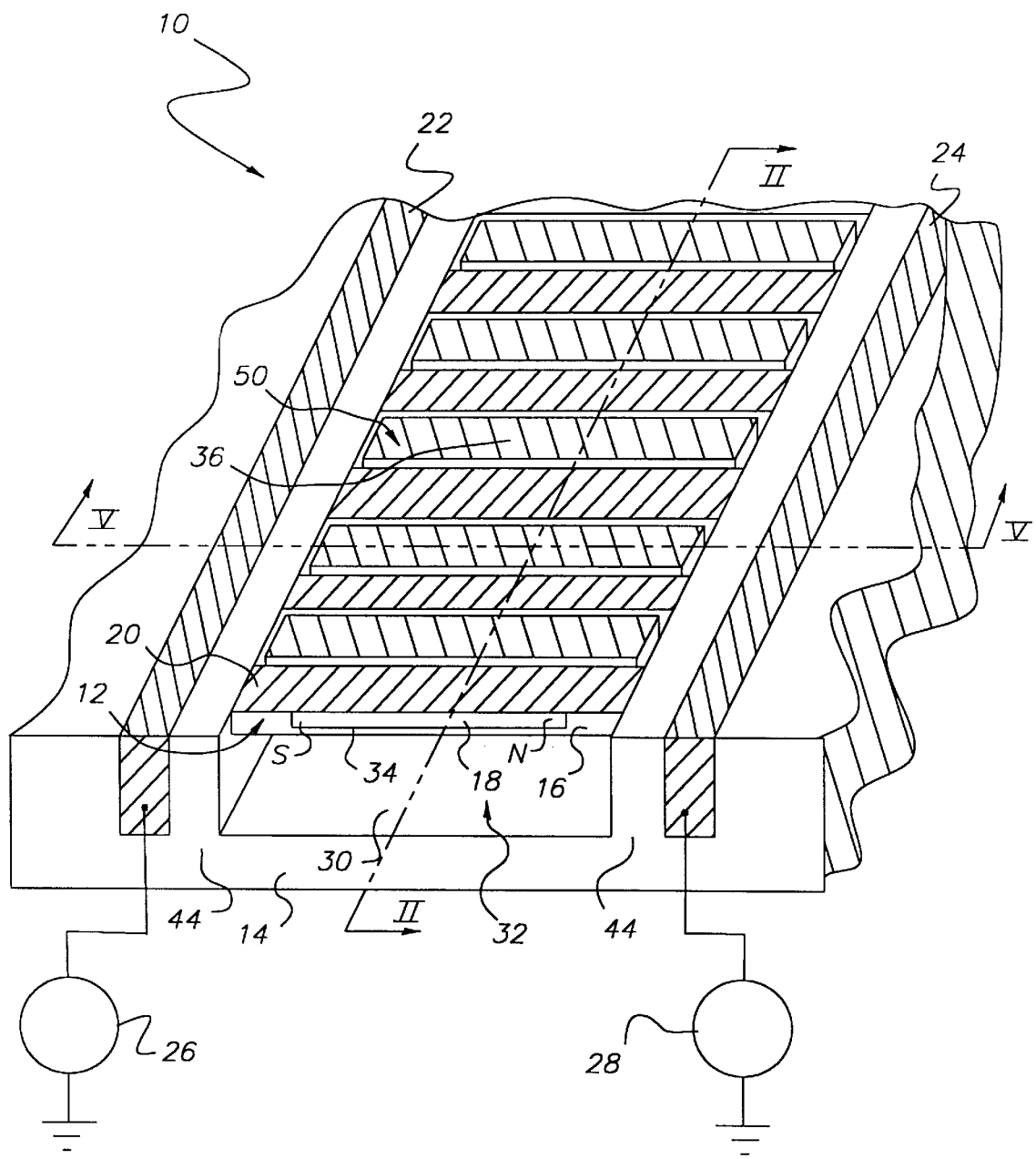
FIG. 1 is a perspective, partially cut-away view of a modulator of the invention.

Referring to FIGS. 1–3, the micromagnetic light modulator 10 for modulating an incident beam of light according to the principles of the invention is illustrated. Broadly defined, light modulator 10 includes a first plurality of equally spaced deformable elements 12 arranged in a substrate 14. Substrate 14 has a cavity 32 defined by base 30 and surrounding side walls 44. Deformable elements 12 are supported at both ends above the cavity 32 with both ends integrally formed in the side walls 44. Each one of the first plurality of deformable elements 12 comprises a base layer 16, preferably silicon nitride or silicon dioxide, having a recess 34, a layer of hard magnetic material 18 is deposited in the recess 34, and a first light reflection layer 20 is deposited on the top of the layer of hard magnetic material 18, as shown. The first light reflection layer 20 is preferably selected from the group consisting of: (a) aluminum, (b) copper, (c) gold, (d) silver, and, (e) alloys thereof. The layer of hard magnetic material 18 is preferably made from cobalt-platinum (Co—Pt) which is deposited for in plane polarization at room temperature using dc or rf magnetron sputtering as described in the publication entitled "Structure and Micromagnetic Predictions for Hysteretic Phenomena in a Novel Co—Pt Permanent Magnetic Thin Film," by R. H. Victora, et al. in Journal of Magnetism and Magnetic Materials, Vol. 97, 1991, pp. 343–352. The layer of hard magnetic material 18 is polarized along its length (see FIG. 4).

Referring to FIGS. 1 and 2, conductive elements 22 and 24 are arranged in the side walls 44 on substrate 14 in proximity to the plurality of deformable elements 12, as shown. Conductive elements 22 and 24 are connected to power sources 26 and 28, respectively. Modulator 10 further comprises a second plurality of equally spaced apart fixed elements 50. Each one of the plurality of fixed elements 50 comprise a support member 52 which is fixedly attached to the base 30 of the cavity 32, and a second light reflection layer 36 which is deposited on top of the support member 52 as shown. According to FIG. 2, a single one of the plurality of fixed elements 50 is arranged between adjacent spaced apart deformable elements 12 such that the first light reflection layers 20 and the second light reflection layers 36 form a substantially planar light reflection surface 48. Second light reflection layer 36 is preferably selected from the group consisting of: (a) aluminum, (b) copper, (c) gold, (d) silver, and (e) alloys thereof. First light reflection layers 20 on the first plurality of deformable elements 12 and the second light reflection layers 36 on the second plurality of fixed elements 50 form a substantially plane surface as shown.

In FIG. 2, the modulator 10 is shown in a sectional view taken along line II—II of FIG. 1. Modulator 10 is illustrated with the power sources 26 and 28 off so that there is no current flowing through conductive elements 22 and 24. When no current flows through conductive elements 22 and 24, the first plurality of deformable elements 12 are flat (i.e., in an up position) due to the inherent residual tensile stress therein. Modulator 10 is designed so that when a light wave 40 of wavelength λ impinges perpendicularly to the surface of the modulator 10, the light reflected from the first light reflection layer 20 on the first plurality of deformable elements 12 is in phase with the light reflected from the plurality of second light reflection layers 36 on second plurality of fixed elements 50. Consequently, modulator 10 reflects light as a flat mirror as indicated by arrow 38.

In FIG. 3 the modulator 10 is shown in a sectional view taken along line II—II of FIG. 1. The power sources 26 and 28 are turned on thereby causing currents to flow in conductive elements 22 and 24 as will be described. The applied currents gives rise to magnetic fields that impart a Lorentz force to the magnetic poles in the layer of hard magnetic material 18 in the first plurality of deformable elements 12. The Lorentz force is sufficient to bend the first plurality of deformable elements 12 downward until the mid-portion of the first plurality of deformable elements 12 deflects a distance λ/4 downward (see FIG. 5). Thus, when a light wave 40 of wavelength λ impinges perpendicularly to the surface of the modulator 10, the light reflected from the first light reflection layer 20 on the first plurality of deformable elements 12 is out of phase with the light reflected from the second light reflection layers 36 on the second plurality of fixed elements. Consequently, modulator 10 diffracts the incident light in directions indicated by arrows 42. Skilled artisans will appreciate that optical systems can be designed to intercept the diffracted light with output occurring only when the first plurality of deformable elements 12 are activated. For display applications, a group of deformable elements 12 can be simultaneously activated to form a pixel, and arrays of such pixels can be fabricated for displaying an image.

Figure 4:
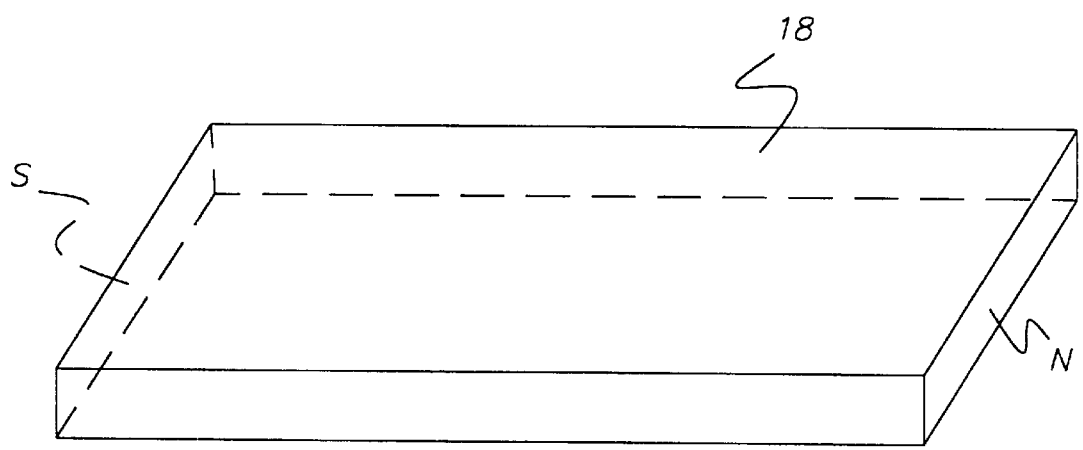
FIG. 4 is a perspective view of a layer of hard magnetic material which has been polarized along its length.

Referring to FIG. 4, a perspective view is shown of a polarized layer 18 of hard magnetic material in isolation. As shown in FIG. 1, magnetic layer 18 comprising this hard magnetic material is disposed in recess 34 of each one of the deformable elements 12.

Referring to FIG. 5, a sectional view is shown of the modulator 10 taken along line V—V of FIG. 1, wherein the first plurality of deformable elements 12 are in an unactivated up position (i.e., power sources 26 and 28 are off).

Referring to FIG. 6, a sectional view is provided of modulator 10 taken along line V—V of FIG. 1. As shown, first plurality of deformable elements 12 are in an activated down position, i.e., power sources 26 and 28 are turned on. Specifically, to activate the first plurality of deformable elements 12, the power sources 26 and 28 cause currents to flow through conductive elements 22 and 24, in a direction out of the paper as indicated by current arrow tips 100 as is well known. The current flowing through the conductive element 22 gives rise to a magnetic field indicated by field line 10 which imparts a downward Lorentz force to the south pole of the layer of hard magnetic material 18. The current flowing through the conductive element 24 gives rise to a magnetic field indicated by field line 120 which imparts a downward Lorentz force to the north pole of the layer of hard magnetic material 18. The currents in conductive elements 22 and 24 are of sufficient magnitude to deflect the mid-portion of the first plurality of deformable elements 12 downward a distance λ/4 as shown. It is instructive to note that the first plurality of deformable elements 12 can be held stationary at this deflected distance as long as the currents in conductive elements 22 and 24 remain constant. It is important to note that the activated first plurality of deformable elements 12 obtain λ/4 the desired deflection over a limited portion of their midsection due to the fact that the first plurality of deformable elements 12 are rigidly supported at both ends. Thus, when a light wave 40 of wavelength λ impinges perpendicularly to the surface of the modulator 10, and the deformable elements 12 are activated in this fashion, the light reflected from the first light reflection layer 20 on the mid-portion of the first plurality of deformable elements 12 that is deflected downward a distance λ/4 is in out of phase with the light reflected from the second light reflection layers 36 on the second plurality of fixed elements 50. Consequently, modulator 10 diffracts the incident light as described above.

The invention has been described in detail with particular reference to certain preferred embodiments thereof, but it will be understood that variations and modifications can be effected within the spirit and scope of the invention.

PARTS LIST:

| | |
|---|---|
| 10 | light modulator |
| 12 | first plurality of deformable elements |
| 14 | substrate |
| 16 | base layer |
| 18 | layer of hard magnetic material |
| 20 | first light reflection layer |
| 22 | conductive element |
| 24 | conductive element |
| 26 | power source |
| 28 | power source |
| 30 | base of cavity |
| 32 | cavity |
| 34 | recess |
| 36 | second light reflection layer |
| 38 | light direction arrow |
| 40 | light wave |
| 42 | light direction arrow |
| 44 | side walls |
| 48 | light reflection surface |
| 50 | second plurality of fixed elements |
| 52 | support member |
| 100 | tip of current arrow |
| 110 | magnetic field line |
| 120 | magnetic field line |

What is claimed is:

1. A modulator for modulating an incident beam of light, comprising:

a substrate comprising a cavity having a base and side walls surrounding said base;

a first plurality of equally spaced apart, deformable elements having opposing end edges integrally formed in said side walls of said substrate just above said cavity, wherein each one of said plurality of deformable elements comprises a base layer having a recess, a poled magnetic layer disposed in said recess, and a first light reflection layer deposited on said magnetic layer for reflecting said incident beam of light;

a second plurality of equally spaced apart, fixed elements wherein each one of said second plurality of fixed elements comprises a support member and a second light reflection layer deposited on said support member for reflecting said incident beam of light, and wherein said support member is fixedly attached to said base of said cavity, and wherein a single one of said plurality of fixed elements is arranged between adjacent spaced apart deformable elements such that said first and second light reflection layers form a substantially planar light reflection surface when said deformable elements are in a first position;

at least one conductive element arranged substantially lengthwise in at least one of said side walls surrounding said cavity in an electromagnetic relationship to said magnetic layer of said first plurality of equally spaced apart deformable elements; and means for applying a current through said conductive element, said current producing a magnetic field in said first plurality of deformable elements that causes said first plurality of deformable elements to deflect to a second position towards said cavity and away from said substantially planar light reflection surface, whereby light reflecting from said plurality of first light reflection layers destructively interferes with light reflected from said plurality of second light reflection layers thereby causing modulation of said incident light.

2. The modulator of claim 1 wherein said base layer is made from silicon dioxide.

3. The modulator of claim 1 wherein said base layer is made from silicon nitride.

4. The modulator of claim 1 wherein said first light reflection layer comprises materials selected from the group consisting of: (a) aluminum, (b) copper, (c) gold, (d) silver, and (e) alloys thereof.

5. The modulator of claim 1 wherein said second light reflection layer comprises materials selected from the group consisting of: (a) aluminum, (b) copper, (c) gold, (d) silver, and (e) alloys thereof.

6. The modulator of claim 1 wherein said conductive element comprises materials selected from the group consisting of (a) aluminum, (b) copper, (c) gold, (d) silver, and (e) alloys thereof.

7. The modulator of claim 1 wherein said poled magnetic layer is made from cobalt-platinum.

* * * * *